United States Patent
Foreman et al.

(10) Patent No.: US 12,420,403 B1
(45) Date of Patent: Sep. 23, 2025

(54) BACKSTOP TO FACILITATE CONTAINER ENGAGEMENT BY ROBOTIC MANIPULATOR

(71) Applicant: Amazon Technologies, Inc., Seattle, WA (US)

(72) Inventors: John Timothy Foreman, Framingham, MA (US); Matthew Budnick, Rutland, MA (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 18/214,370

(22) Filed: Jun. 26, 2023

(51) Int. Cl.
| | |
|---|---|
| *B25J 9/00* | (2006.01) |
| *B25J 9/02* | (2006.01) |
| *B65G 13/02* | (2006.01) |
| *B65G 43/00* | (2006.01) |
| *B65G 47/53* | (2006.01) |

(52) U.S. Cl.
CPC ........... *B25J 9/0096* (2013.01); *B25J 9/0093* (2013.01); *B25J 9/026* (2013.01)

(58) Field of Classification Search
None
See application file for complete search history.

(56) References Cited

U.S. PATENT DOCUMENTS

| | | | | |
|---|---|---|---|---|
| 6,059,092 | A * | 5/2000 | Jerue | B65G 1/1373 198/364 |
| 8,074,431 | B1 * | 12/2011 | Pierson | B65G 61/00 53/529 |
| 9,610,692 | B2 * | 4/2017 | Guidi | B65G 61/00 |
| 9,725,238 | B2 * | 8/2017 | Mathys | B65G 1/0492 |
| 9,758,300 | B2 * | 9/2017 | Nakamura | B65G 47/912 |
| 2008/0213080 | A1 * | 9/2008 | Cachelin | F25D 25/04 414/791.6 |
| 2010/0178149 | A1 * | 7/2010 | Fritzsche | B65G 57/22 414/789.5 |

FOREIGN PATENT DOCUMENTS

| | | | | |
|---|---|---|---|---|
| CN | 115557262 B | * | 10/2024 | ............... A61L 2/00 |

* cited by examiner

*Primary Examiner* — Kavel Singh
(74) *Attorney, Agent, or Firm* — Kilpatrick Townsend & Stockton LLP

(57) ABSTRACT

An inventory handling system may implement a backstop to facilitate container engagement by a robotic manipulator. The system may include a second set of rollers positioned lower than a first set of rollers so as to define a stepped interface. The roller sets may be configured to carry a container. A backstop surface may be positioned along the stepped interface between the first set of rollers and the second set of rollers. The backstop surface may be arranged so as to contact a trailing side of the container traveling on the second set of rollers and in response to a robotic end effector pushing a leading side of the container towards the backstop surface and the first set of rollers. The backstop surface may be configured to resist movement of the container to enable the robotic end effector to engage with the leading side of the container.

20 Claims, 14 Drawing Sheets

1100

Move a tote on a first set of rollers in a first direction towards a second set of rollers, the second set of rollers positioned lower than the first set of rollers so as to define a stepped interface
1102

Move a tote, from the first set of rollers to the second set of rollers, over a pivotable backstop that is situated in a first position and is located along a stepped interface
1104

Push a leading side of the tote by a robotic end effector in a second direction opposite to the first direction so as to move a trailing edge of the tote towards the stepped interface and the first set of rollers
1106

Engage a trailing side of the tote with a flange edge of the pivotable backstop so as to resist movement of the tote in the second direction
1108

Engage, as a result of the robotic end effector pushing the tote in the second direction, the leading side of the tote with the robotic end effector as the flange edge of the pivotable backstop prevents the tote from being pushed past the pivotable backstop in the second direction and enables the robotic end effector to engage with the leading side
1110

Pivot the pivotable backstop to a second position in response to the robotic end effector exerting on the tote a force exceeding a predetermined threshold.
1112

```
Move, via a first set of rollers, a second tote in the first direction towards the
second set of rollers and the pivotable backstop in the second position
1202
```

```
Engage the leading side of the second tote with the flange edge of the pivotable
backstop
1204
```

```
Pivot the pivotable backstop to the first position in response to the second tote
pushing the flange edge as the second tote moves in the first direction.
1206
```

FIG. 12

BACKSTOP TO FACILITATE CONTAINER ENGAGEMENT BY ROBOTIC MANIPULATOR

BACKGROUND

Storage facilities catering to order fulfillment, such as online grocery store fulfillment centers, often process thousands of orders a day while housing large inventories to meet the demands. Fulfilling an order can involve resources, including automated resources such as robots, conveyors, sensors, etc., which can be used in varying processes. One such process is the movement of inventory and containers, which may be frequently transferred to different locations, such as to conveyors located at workstations, or inventory holders for container storage. Thus, secure engagement with containers is important to ensure safe and efficient movement of containers throughout the storage facility.

BRIEF DESCRIPTION OF THE DRAWINGS

Various embodiments in accordance with the present disclosure will be described with reference to the drawings, in which:

FIG. 11 is a flow chart that illustrates an example of a process of handling containers in accordance with various embodiments;

FIG. 12 is a flow chart that illustrates an example of a process of resetting a pivotable backstop in accordance with various embodiments.

DETAILED DESCRIPTION

Figure 1:
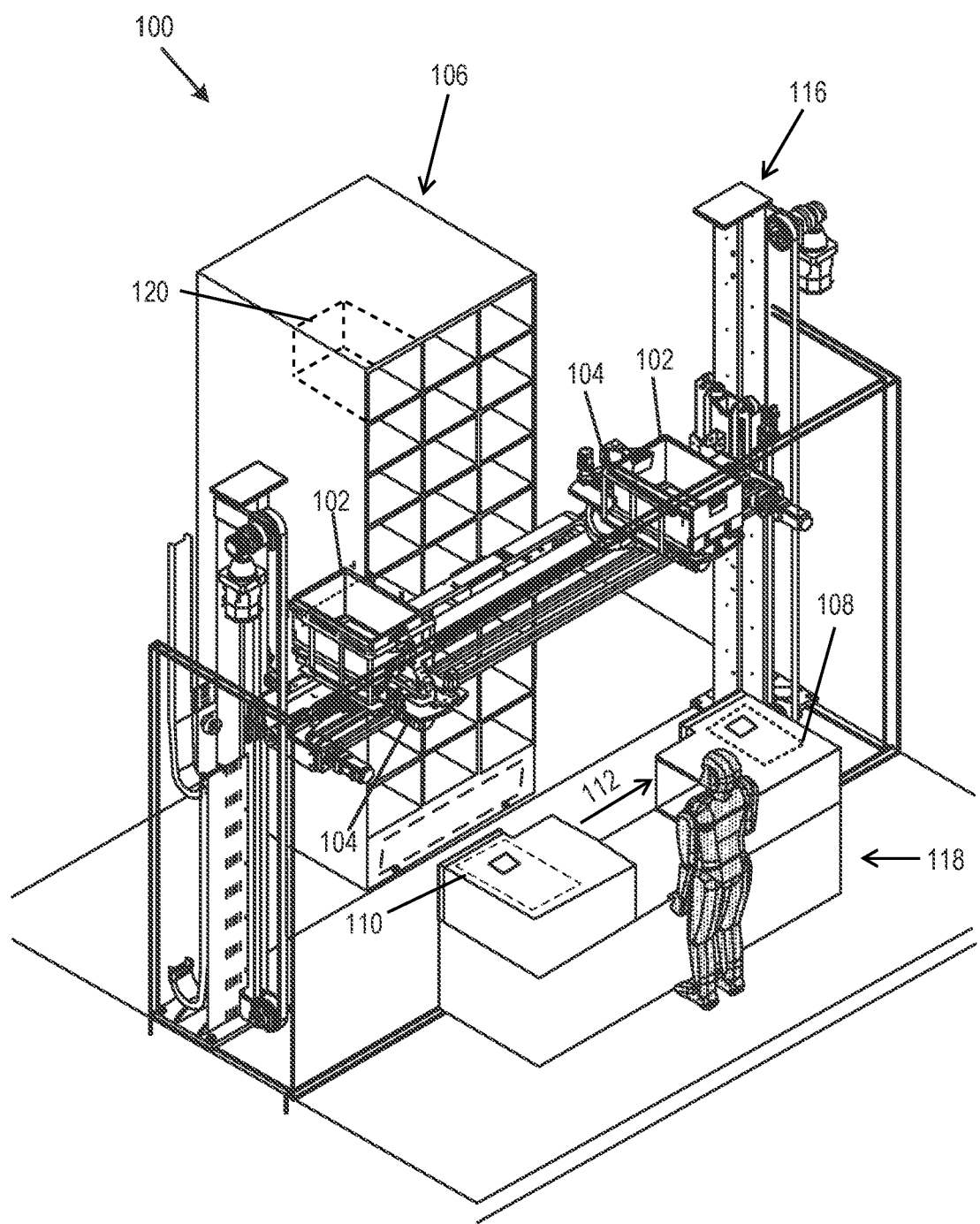
FIG. 1 illustrates a perspective view of an example of an inventory management system in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples herein are directed to, among other things, systems and techniques relating to a container engagement system that can be utilized for inventory handling and transport. Features herein are directed to the implementation of a backstop system to enable the engagement of a container by a robotic end effector using limited force.

As one example, a container engagement system can include a conveyor for transporting containers. The conveyor may include at least a first set of rollers and a second set of rollers with a stepped interface situated between the two roller sets. For example, the stepped interface may represent at least two abutting or adjacent surfaces that are situated so as to create an uneven or step configuration. A backstop surface can be integrated into the stepped interface and configured to resist movement of a container from one side of the container to enable a robotic end effector to engage with the container from an opposite side of the container. For example, the backstop surface can be arranged to contact a trailing side of a container in response to a robotic end effector pushing a leading side of the container towards the backstop surface. Thus, the backstop surface can be utilized to prevent the container further moving as the robotic end effector pushes against the container to grasp the container, such as to achieve a suitable seal with a suction cup borne by the robotic end effector.

The backstop surface may correspond to a surface of a roller along the stepped interface. For example, the backstop surface may be included an upper roller such that a container pushed along a lower set of rollers can be pushed into contact with the backstop surface on the upper roller. Additionally or alternatively, the backstop surface may include a pivotable structure designed to engage with the container. For example, a pivotable backstop may be situated along the stepped interface. The pivotable backstop may include a pivot shaft mounted to allow pivoting along an axis. The pivotable backstop may further include a flange extending from away from the axis of pivot shaft and ending in an edge. The pivotable backstop can be designed so that the edge of the flange can engage with a side of the container and resist further movement of the container. For example, when a container is pushed by a robotic end effector against the edge of the pivotable backstop, the pivotable backstop may engage with the trailing side of the container and resist the movement of the container, allowing the robotic end effector to engage with the leading side of the container. The pivotable backstop also may be configured to pivot away from the container. For example, if the robotic end effector exerts a force on the container that exceeds a predetermined threshold, the pivotable backstop may pivot to a second position. Thus, the amount of force between the container and the pivotable backstop may be limited, which may avoid hazards to any objects that may be incidentally positioned between the containers and the pivotable backstop and/or may avoid damage to the containers from immoderate force exerted by robotic end effectors.

Referring now to the drawings, FIG. 1 illustrates a perspective view of an example of an inventory management system 100 in accordance with various embodiments. The system 100 can include one or more inventory holders 106, a workstation 118, and a transfer apparatus 116. The inventory management system 100 can facilitate the picking and stowing of containers 102 (e.g., totes) between one or more inventory holders 106 and/or workstations 118. For example, the inventory management system 100 can facilitate the entry, processing, and/or removal of containers 102 from the inventory management system 100 and the completion of other tasks involving inventory items. Various embodiments are described herein in the context of the illustrative use case of the inventory management system 100 including containers 102 engaging with robotic end effectors 104 and being transferred to varying locations. However, the embodiments are not limited as such and can similarly apply to other form factors including, for instance, containers 102 corresponding to totes for transfer of items, forms of robotic manipulator other than the particular transfer apparatus 116 depicted, and/or other environments that may differ from the workstation 118 and/or other elements depicted and/or described. Furthermore, in various embodiments, the workspace 118 may represent a portion of or all of a floor of a warehouse environment in which the inventory management system 100 operates.

For simplicity, containers 102 are shown and described herein, however, various types of receptacles may be used, which include, but are not limited to, totes, cardboard boxes, etc. Moreover, the containers 102 may be made of a variety of materials suitable for gripping or otherwise engaging, including, but not limited to plastic (such as may be present in tote containers that are prevalently used in order fulfillment warehouses), corrugate, cardboard (such as may be present in shipping boxes that are also prevalently used in order fulfillment warehouses), metal, etc. For example, totes made of plastic easily gripped by a robotic end effector 104 may be used in the inventory management system 100.

The inventory management system 100 can be arranged so that the operators do not have direct access to the inventory holders 106 and, instead, a transfer apparatus 116 may be used to transfer items to and from the operator via the workstation 118. In some embodiments, the workstation 118 may include a receiving station 110 in which containers 102 may be received to then be processed. For example, the workstation 118 may include a drop off area where a container 102 can be deposited to be handled. Furthermore, the workstation 118 may include a collection station 108 in which containers 102 can be collected from the workstation 118. For example, the workspace 118 may include a pickup area where a container 102 can be collected by the transfer apparatus 116 to move to a different location such as the one or more inventory holders 106.

A transfer apparatus 116 can be employed to transfer containers 102 and/or inventory items to particular locations on and/or around the workstation 118. For example, a robot with a robotic end effector 104 can be used to collect a container 102 from an inventory holder 106 and deliver said container 102 to a drop off location at a workstation 118 for processing. Various embodiments are described herein in the context of the illustrative use case of the transfer apparatus 116 including a robotic end effector 104 being used to engage with a container 102. However, the embodiments are not limited as such and can similarly apply to other item handling methods including, for instance, use of alternative appropriate robotic operators and/or systems.

Furthermore, various embodiments are described herein in the context of the illustrative use case of a transfer apparatus 116 including a robotic end effector 104 which uses suction cups to engage with containers 102. However, the embodiments are not limited as such and can similarly apply to other types of robotic end effectors 104 such as pneumatic grippers, electric grippers, mechanical grippers, etc. For example, an end effector 104 employing a pneumatic gripper can be used to grasp a container 102 located at a workstation 118.

In some embodiments, the workstations 118 can include one or more conveyors 112 to carry containers 102 to different locations, such as between the pickup and drop off locations. In an example, in response to receiving a customer order, a robotic end effector 104 can collect a container 102 from an inventory holder 106 and carry the container 102 to a drop off location at a workstation 118 (such as at the receiving station 110). The tote 102 can then be carried by the conveyor 112 to a location to fulfill the customer order. Finally, the container 102 can be carried via the conveyor 112 to a pickup location (such as at the collection station 108) where a robotic end effector 104 can engage with the container 102 to pick up and transport the container 102 to the inventory holder 106 and/or another appropriate location.

In various embodiments, the inventory holder 106 may be used to stow and access containers 102 for collection using, for example, the transfer apparatus 116 which may include a robotic end effector 104 for engagement with containers 102 With respect to accessing a container 102 included in the inventory holder 106, a robotic end effector 104 may press against a container 102 to engage with the container 102 for transfer. When the robotic end effector 104 presses against the container 102, the back wall of the inventory holder location 120 included in the inventory holder 106 can prevent the container 102 from moving further away from the robotic end effector 104 so that the robotic end effector 104 can get an adequate suction cup application or other grip. In comparison, the robotic end effector 104 may readily disengage with the container 102 at the receiving station 110 (e.g., by releasing suction or deactivating a different grip). Furthermore, the collection station 108 of the workstation 118 can also include components to facilitate engagement between the robotic end effector 104 and a container 102, such as described further with respect to FIG. 2.

Figure 2:
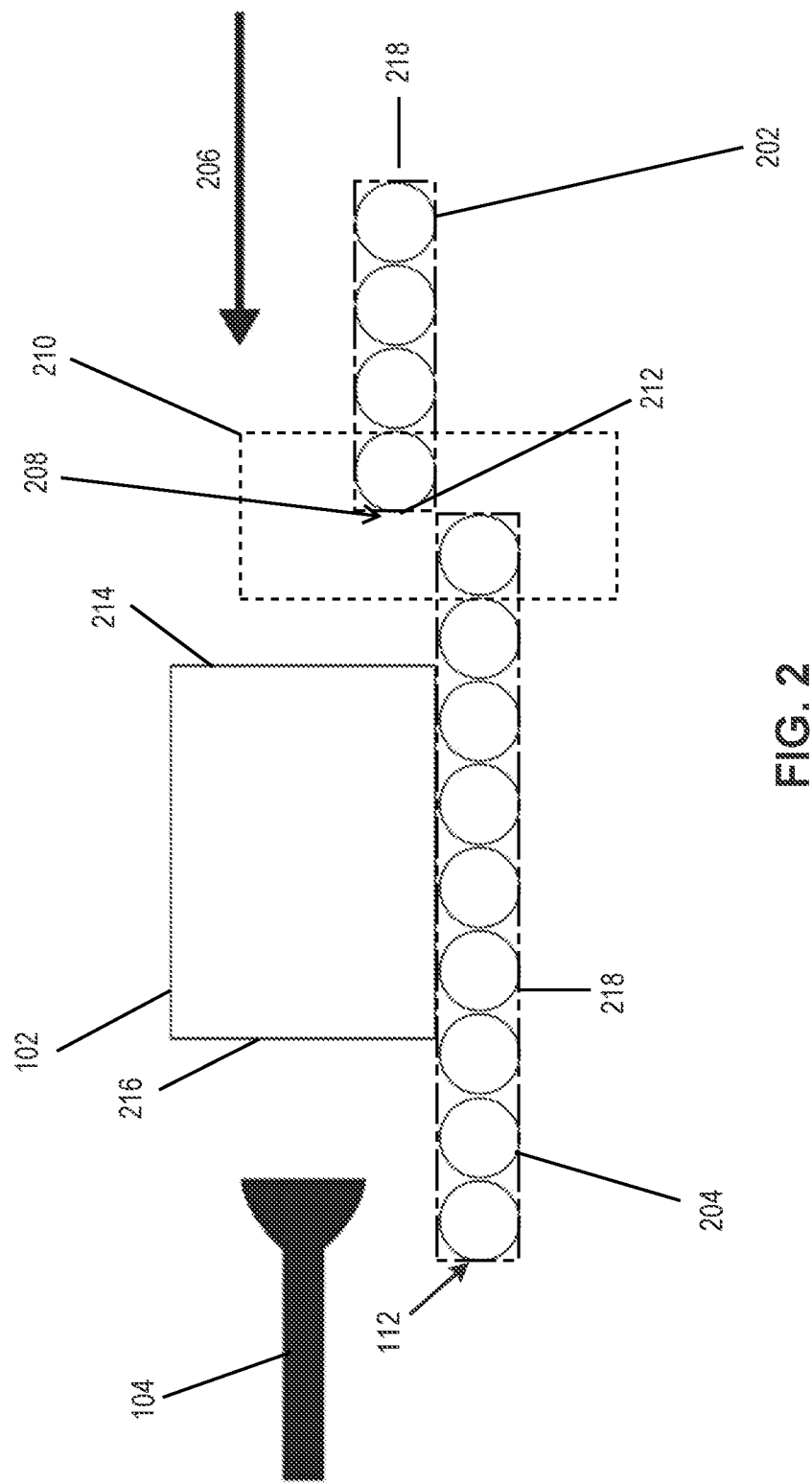
FIG. 2 illustrates an example of a container engagement system that may be utilized in the inventory management system of FIG. 1 and that includes a stepped interface in accordance with various embodiments.

FIG. 2 illustrates an example of a container engagement system that may be utilized in the inventory management system 100 of FIG. 1 and that includes a stepped interface 210 in accordance with various embodiments.

As briefly discussed with respect to FIG. 1, the system 100 can include a conveyor 112 configured to carry items such as containers 102 for such purposes as fulfilling customer orders. In some embodiments, the conveyor 112 can include at least a first set of rollers 202 and a second set of rollers 204 which can be adjacent to each other at an end. Positioning the first set of rollers 202 and the second set of rollers 204 adjacent one another can allow the conveyor 112 to carry a container 102 from one set of rollers 202, 204 to the next. For example, a container 102 can be carried by the first set of rollers 202 and transferred to the second set of rollers 204, which can continue to move the container 102 in the desired direction (e.g., in a first direction 206, which may correspond to a conveyance direction). In some embodiments, a robotic end effector 104 may also be located in proximity to the conveyor 112 such that the end effector 104 can reach a container 102 traveling on the conveyor 112. For example, a robotic end effector 104 with a suction cup or other engagement device can reach a container 102 traveling on the second set of rollers 204 and engage with a leading side 216 of the container 102.

The first set of rollers 202 and the second set of rollers 204 can be arranged so as to define a stepped interface 210. For example, the second set of rollers 204 can be positioned lower than the first set of rollers 202, thereby creating a "step" or "ledge" on the conveyor 112. As depicted in FIG. 2, the stepped interface 210 can include a roller surface 212 positioned above the second set of rollers 204. A backstop surface 208 can be integrated into the roller surface 212 such that the backstop surface 208 is positioned along the stepped interface 210.

Although a set of rollers 202, 204 are shown and described, as depicted by the dotted line numbered 218, a variety of conveyance mechanisms 218 are possible including but not limited to belt conveyors, ball transfer conveyors, magnetic conveyors, pneumatic conveyors, fluid conveyors, vibratory conveyors, etc. The stepped interface 210 is thus not limited to being defined by rollers but additionally or alternatively may be formed by a difference in height between structures of any form of conveyance mechanism 218. Similarly, although depicted and described herein as a roller surface 212, alternative arrangements may be possible with respect to the surface 212 based on the conveyance mechanisms 218 used. Moreover, the backstop surface 208 may be incorporated into any structure of any form of conveyance mechanism 218. As one non-limiting example, the backstop surface 208 may be integrated into and/or correspond to a belted surface or other portion of a belt conveyor arranged along the stepped interface 210. As another non-limiting example, the backstop surface 208 may be incorporated into an edge of a tabletop, frame, or other support that may bear a ball transfer conveyor or other form of conveyance mechanism 218.

Figure 3:
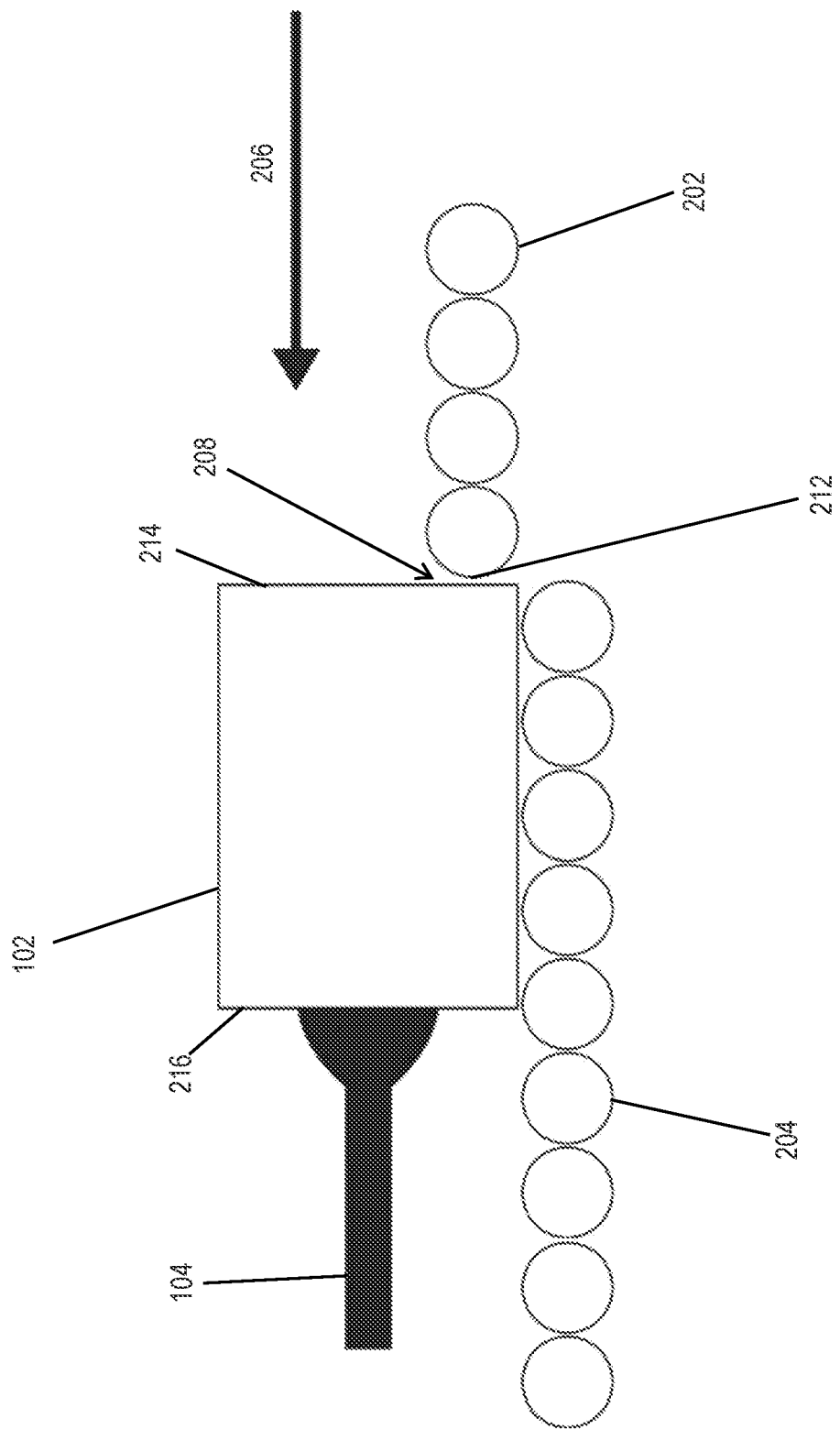
FIG. 3 illustrates the container engagement system of FIG. 2 with the robotic end effector engaged with a container in accordance with various embodiments.

FIG. 3 illustrates the container engagement system of FIG. 2 with the robotic end effector 104 engaged with a container 102 in accordance with various embodiments. As previously discussed, a robotic end effector 104 can be implemented to engage with containers 102 supported by the conveyor 112. When a container 102 is carried by the conveyor 112 to the appropriate location, the robotic end effector 104 can be arranged to extend and contact a leading side 216 of the container 102. For example, the robotic end effector 104 may be arranged to move toward the container 102 by moving contrary to the first direction 206 (such as in a rightward direction as depicted in FIG. 3) As the robotic end effector 104 comes into contact with the container 102, the robotic end effector 104 can continue to exert a force on the container 102 during engagement with the leading side 216 of the container 102. For example, the robotic end effector 104 can extend, contact a leading side 216 of the container 102, and continue to move forward to form a suction seal sufficient to secure the container 102. The robotic end effector 104 may then remove the container 102 from the conveyor 112 as it maintains engagement.

As the robotic end effector 104 exerts a force upon the leading side 216, the container 102 may be pushed along the conveyor 112. This can be problematic in instances when the natural weight of the tote 102 does not provide sufficient frictional resistive force for the robotic end effector 104 to engage with the container 102. For example, a container 102 may be empty, difficult to grasp due to the container's 102 texture, and/or warped. In such circumstances, a robotic end effector 104 may apply some force to engage with the side of the container 102. However, without sufficient resistive force, instead of engaging with the container 102, the robotic end effector 104 may push the container 102 along the conveyor 112 as it attempts to grasp a side. Embodiments of the present disclosure can improve upon this situation by implementing a backstop surface 208 along the conveyor 112 to provide sufficient resistive force for the robotic end effector 104 to grasp the container 102.

The backstop surface 208 can be arranged to come into contact with a trailing side 214 of a container 102. The backstop surface 208 may impede the movement of the container 102 and hinder transition of the containers 102 backward between the set of rollers 202, 204. Furthermore, the robotic end effector 104 can be used to push the container 102 into the backstop surface 208. In turn, the backstop surface 208 can resist the movement of the container 102 to enable the robotic end effector 104 to engage with the leading side 216 of the container 102. In some embodiments, the backstop surface 208 can be positioned at a height such that when the robotic end effector 104 exerts a force exceeding a particular threshold, the container 102 can roll up from the second set of rollers 204 to the first set of rollers 202 or otherwise overcome the stepped interface 210 and continue moving on the first set of rollers 202. In this case, the particular threshold may be sufficiently high enough to allow the robotic end effector 104 to engage with the container 102. For example, the robotic end effector 104 can exert a force on the container 102 allowing engagement with the container 102, however if the robotic end effector 104 increases the force exerted and exceeds the particular threshold, the container 102 can overcome the backstop surface 208 and transfer to the first set of rollers 202. Alternatively, the backstop surface 208 may be configured to prevent the container 102 from overcoming the stepped interface 210 even when the particular threshold is met, effectively stopping the movement of the container 102 along the conveyor 112.

As noted previously, although the backstop surface 208 is primarily described herein as integrated into the roller surface 212, the backstop surface 208 may be integrated into various surfaces along various conveyance mechanisms 218 (e.g., belt conveyors, ball transfer conveyors, magnetic, pneumatic, etc.) In such situations, similarly as described with respect to a backstop surface 208 integrated into a roller surface 212, the backstop surface 208 when integrated into some other form of conveyance mechanism 218 can be arranged to come into contact with a trailing side 214 of a container 102 and can be configured to provide sufficient resistive force for a robotic end effector 104 to grasp a container 102.

Figure 4:
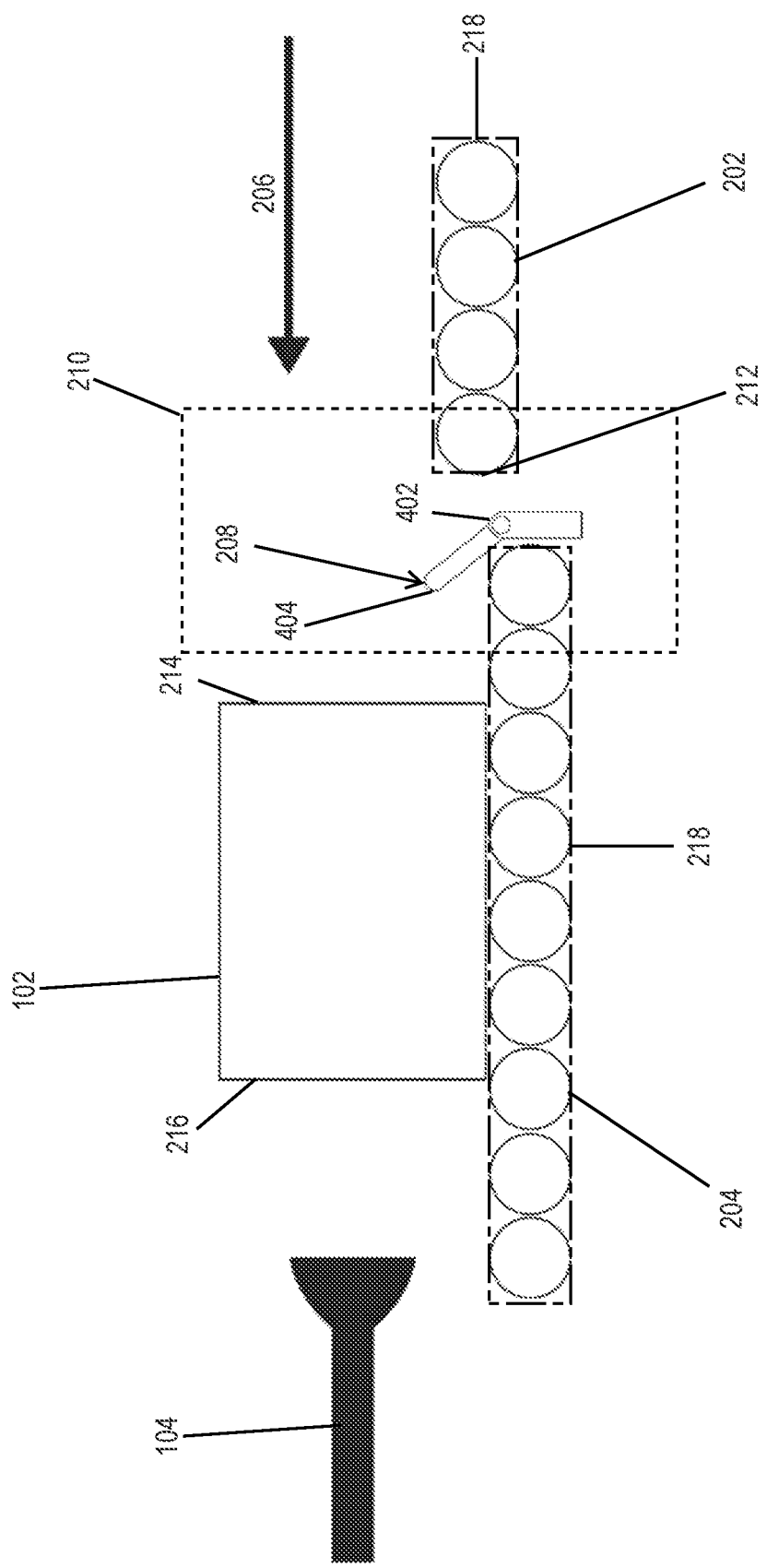
FIG. 4 illustrates the container engagement system of FIG. 2 with a pivotable backstop included at the stepped interface in accordance with various embodiments.

FIG. 4 illustrates the container engagement system of FIG. 2 with a pivotable backstop 402 included at the stepped interface 210 in accordance with various embodiments. The pivotable backstop 402 may be positioned along the stepped surface between the first and second set of rollers 202, 204.

The pivotable backstop 402 can include a flange surface 404 that can function as the backstop surface 208 configured to engage with the trailing side 214 of the container 102. In this case, if the container 102 is traveling towards the pivotable backstop 402, the flange surface 404 can engage with the trailing side 214 of the container 102 once the trailing side 214 makes contact with the flange surface 404. The pivotable backstop 402 may then resist the movement of the container 102, e.g., hindering transition of the container 102 from the second set of rollers 204 to the first set of rollers 202.

In some embodiments, the robotic end effector 104 can include a suction cup, which may be subject to a distinct resistive force for the suction cup to successfully engage with a surface. For example, without a backstop surface 208 present, a robotic end effector 104 may contact a container 102 and exert force in an attempt to create a suction seal for engaging with the leading side 216 of the container 102. However, in some cases, the force suitable to make a seal may be higher than the force which causes the container 102 to be pushed away from the robotic end effector 104. Thus, as the robotic end effector 104 pushes forward against the container 102, the robotic end effector 104 may be unable to exert a force adequate to create a seal absent the backstop 208 because the container 102 may continue to move in the direction the robotic end effector 104 is pushing.

Although the pivotable backstop 402 is shown and described as being integrated into a stepped interface 210, other arrangements are possible. For example, the pivotable backstop 402 can be positioned between the first set of rollers 202 and the second set of rollers 204 without the inclusion of a stepped interface 210. The first set of rollers 202 and the second set of rollers 204 may be of similar or equal height to each other creating a level or nearly level conveyor 112. The pivotable backstop 402 can be positioned between the two sets of rollers 202, 204 such that the flange surface 404 is exposed above the conveyor 112 and configured to engage with a trailing side 214 of a container 102.

Alternatively, the pivotable backstop 402 can be positioned along a stepped interface 210. For example, the second set of rollers 204 can be placed lower than the first set of rollers 202. Such an arrangement may create a raised ledge on the conveyor 112. The pivotable backstop 402 can be positioned between the two sets of rollers 202, 204 in a position along the roller surface 212 at an extreme end of the first set of rollers 202, for example. The flange surface 404 may extend above the first and second set of rollers 204. The pivotable backstop 402 may be capable of pivoting between a first and second position. In some embodiments, the pivotable backstop 402 can be capable of pivoting to a first position where the pivotable backstop 402 is oriented at an angle between 0 and 90 degrees with respect to the conveyor 112 and the flange surface 404 is facing the same direction as the movement of the conveyor 112. Additionally or alternatively, the pivotable backstop 402 can be capable of pivoting to a second position such that the pivotable backstop 402 is rotated between 90 and 180 degrees where the flange surface 404 is oriented in the direction contrary to the movement of the conveyor 112. The rotation of the pivotable backstop 402 can be limited by the height of the first set of rollers 202 and the stepped interface 210, or the pivotable backstop 402 can be positioned such that the stepped interface 210 does not interfere with the pivoting of the pivotable backstop 402.

Furthermore, although the pivotable backstop 402 is described herein as being used in tandem with a first and second set of rollers 202, 204, the pivotable backstop 402 may be used alongside various types of conveyance mechanisms 218 (e.g., belt conveyors, ball transfer conveyors, magnetic, pneumatic, etc.) For example, the pivotable backstop 402 may be positioned between a first belt conveyor and a second belt conveyor.

Figure 5:
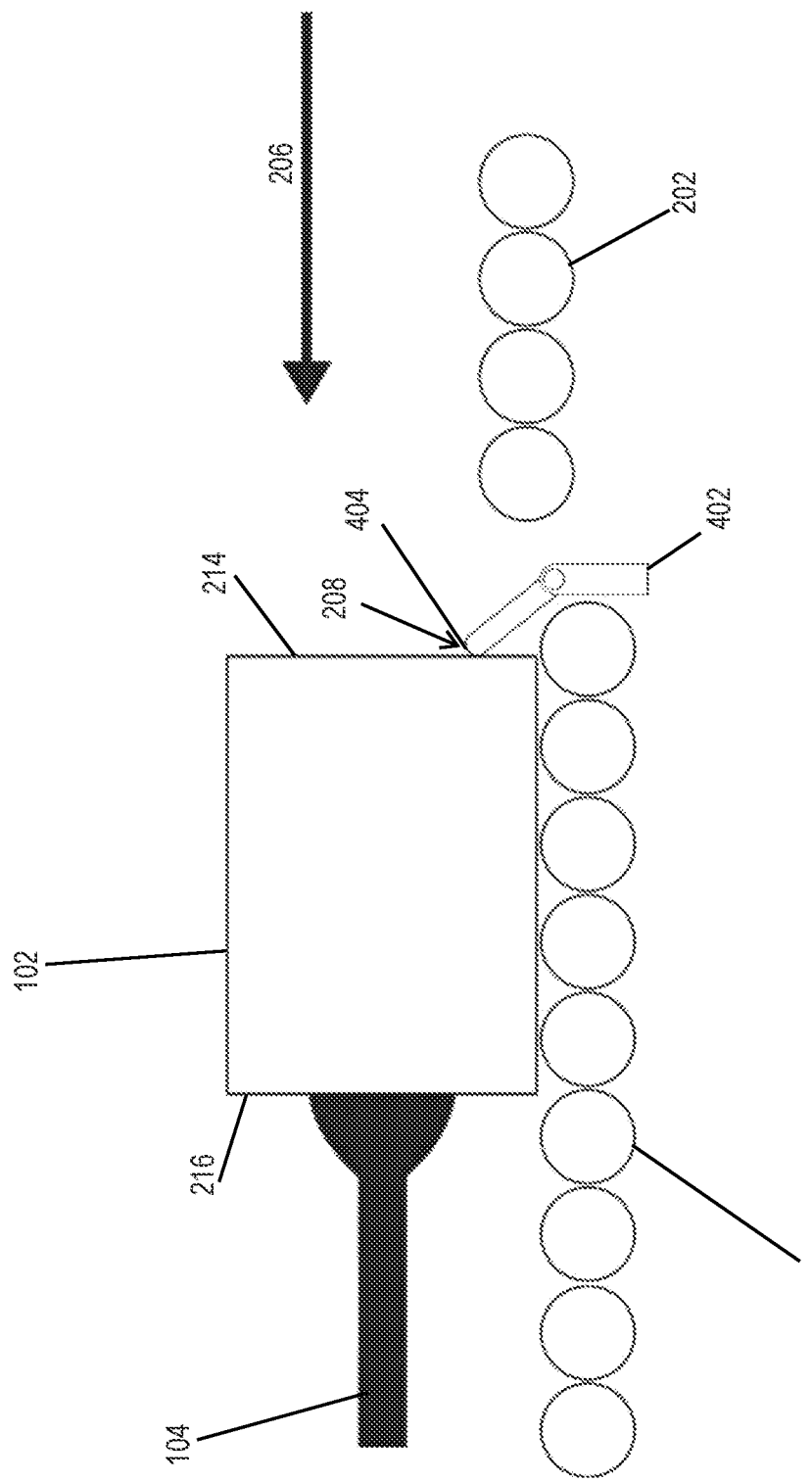
FIG. 5 illustrates the container engagement system of FIG. 4 with the pivotable backstop engaged with a container accordance with various embodiments.

FIG. 5 illustrates the container engagement system of FIG. 4 with the pivotable backstop 402 engaged with the container 102 in accordance with various embodiments. As discussed with respect to FIG. 4, a flange surface 404 of the pivotable backstop 402 can be configured to engage with the container 102 as the container 102 comes into contact with the flange surface 404. Once engaged, the pivotable backstop 402 can resist the force exerted by the robotic end effector 104 via the container 102. For example, a leading side 216 of the container 102 may be pushed by the robotic end effector 104 and cause a trailing side 214 of the container 102 to make contact with the backstop surface 208 of the pivotable backstop 402. The pivotable backstop 402 can then resist further movement of the container 102 as the robotic end effector 104 engages with the container 102 and applies a limited force to the leading side 216 of the container 102. By incorporating a backstop surface 208 in a pivotable backstop 402 in the container engagement system, the container 102 can be held in place as a suction cup makes a seal and engages with the leading side 216 of the container 102, for example.

Figure 6:
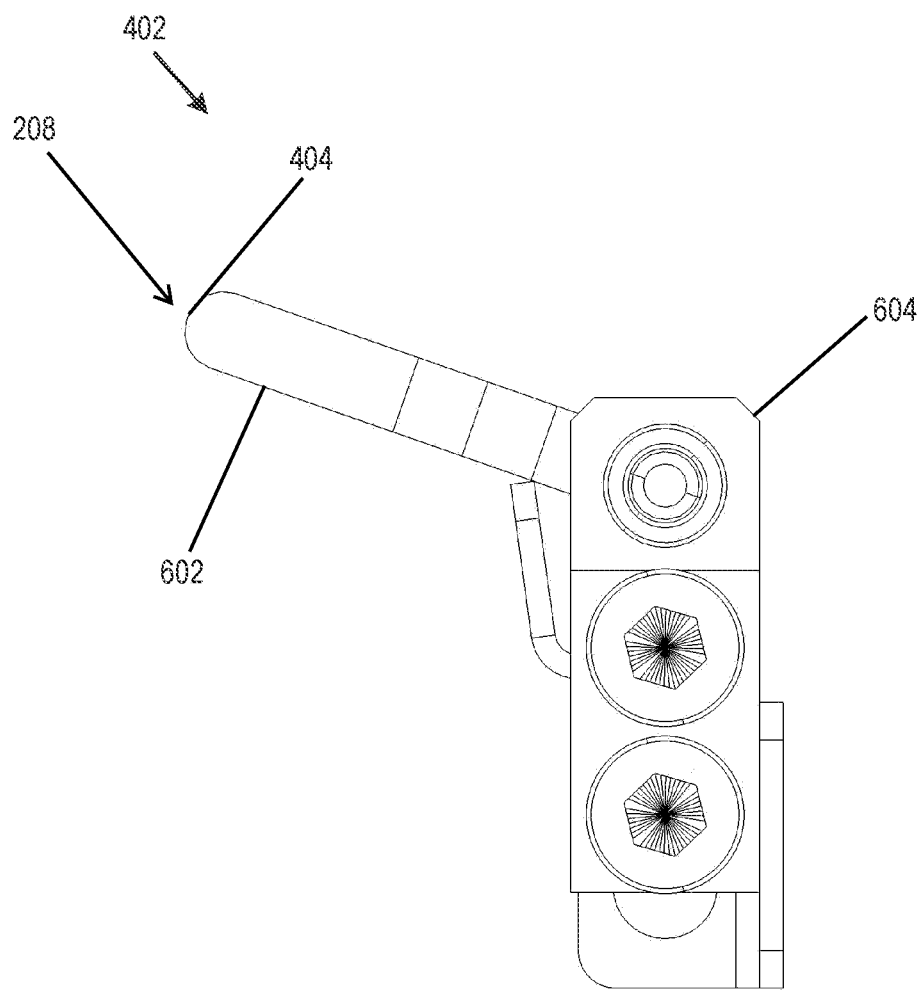
FIG. 6 illustrates a side view of an example of a pivotable backstop that may be used in the system of FIG. 5 in accordance with various embodiments.

FIG. 6 illustrates a side view of an example of a pivotable backstop 402 that may be used in the system of FIG. 5 in accordance with various embodiments. The pivotable backstop 402 can include a pivot shaft 1002 with a flange 602 extending from the base of the pivot shaft 1002 and terminating at the flange surface 404 (e.g., such as an edge of the flange 602). The pivot shaft 1002 can move the flange 602 from at least a first position to a second position, e.g., in which the first position corresponds to engaging with a container 102 when a container 102 comes into contact with the flange surface 404 and in which the second position corresponds to disengaging and pivoting away from a container 102 when the force exerted on the flange 602 exceeds a threshold value.

Figure 10A:
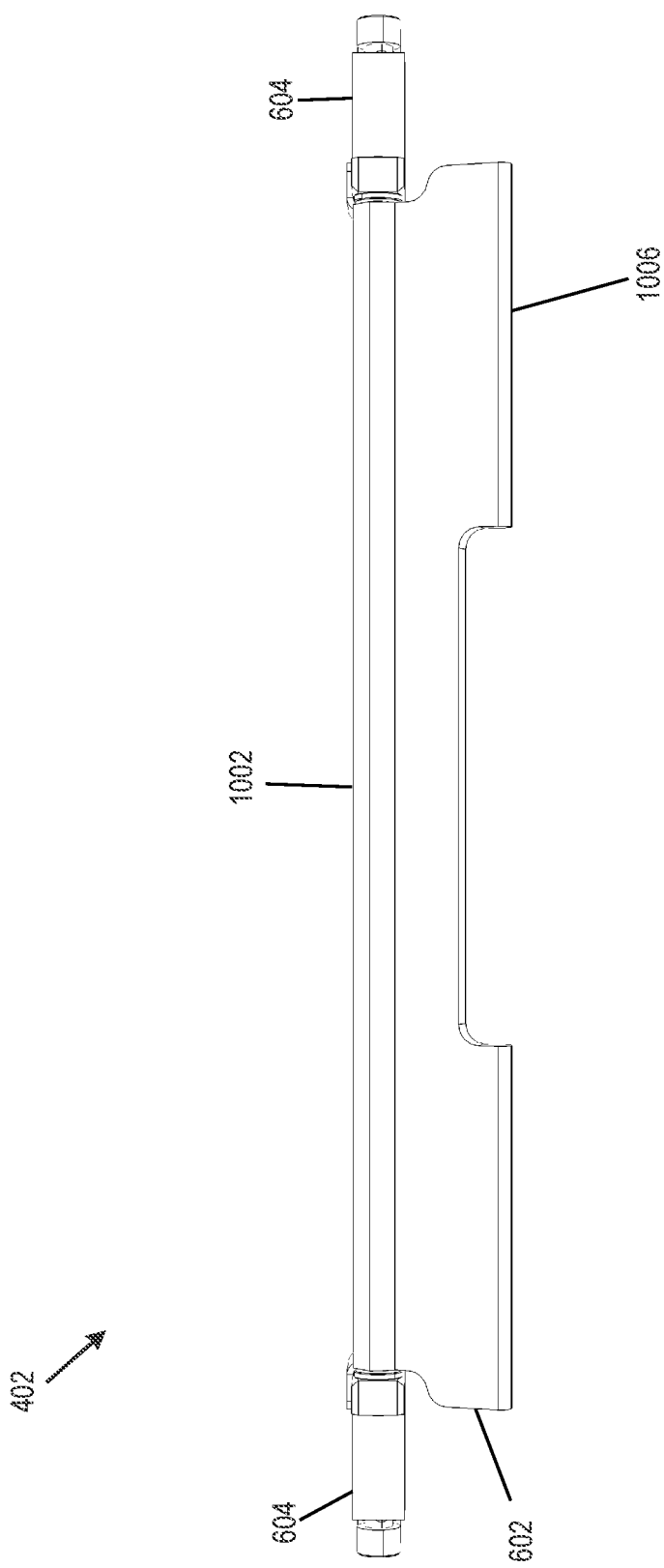
FIG. 10A illustrates a top view of an example of a pivotable backstop that can be used in the system of FIG. 5 in accordance with various embodiments.
Figure 10B:
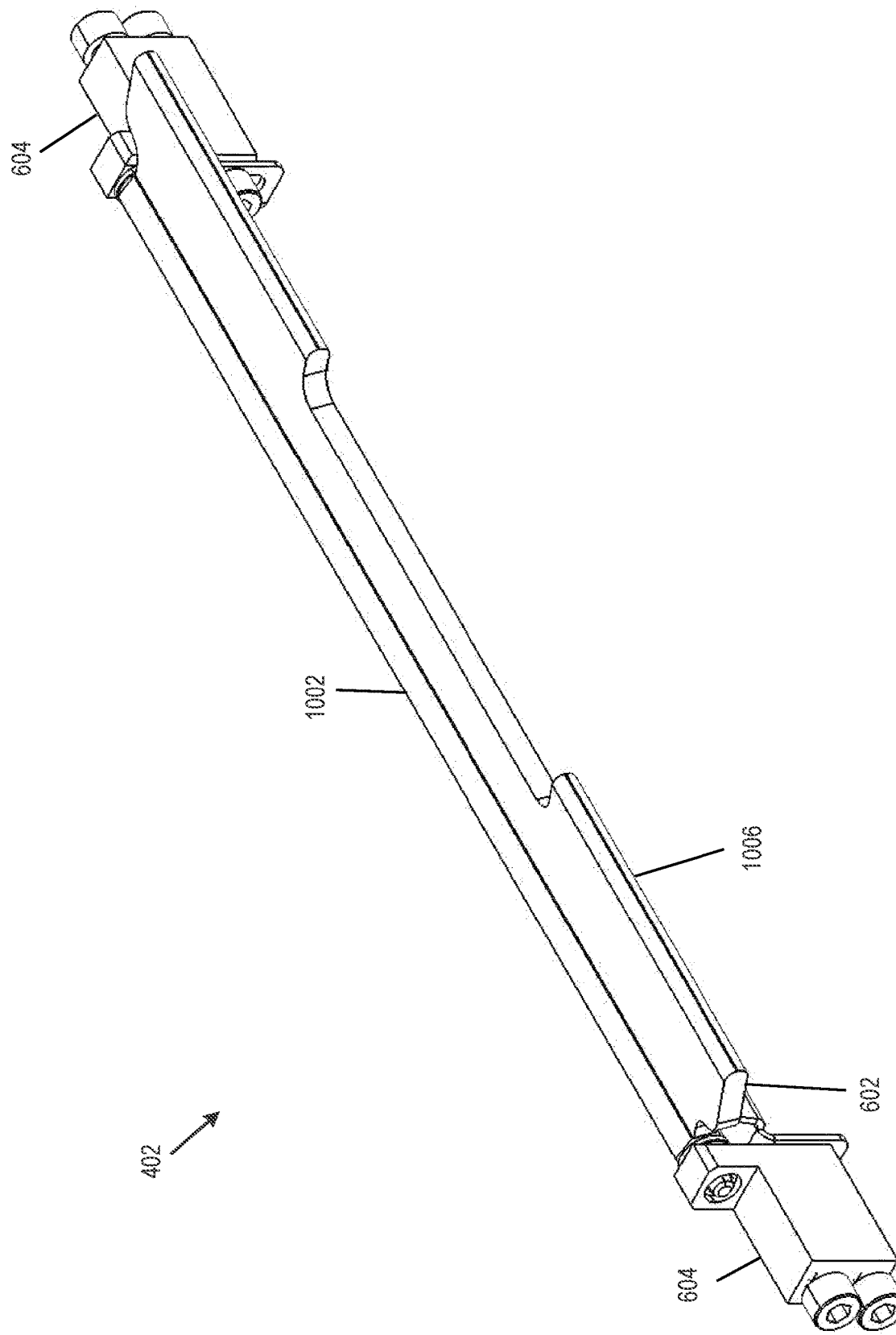
FIG. 10B illustrates a perspective view of the pivotable backstop of FIG. 10B in accordance with various embodiments.

As may be most readily seen with respect to FIG. 10A and FIG. 10B, the pivotable backstop 402 can include a first pivot mount 604 and a second pivot mount 604 coupled to the pivot shaft 1002. The first and second pivot mounts 604 can be positioned between a first set of rollers 202 and a second set of rollers 204 (e.g., FIG. 5). Referring again to FIG. 10A and FIG. 10B, the first and second pivot mounts 604 can be positioned such that the first pivot mount 604 may be parallel to the second pivot mount 604. The pivot shaft 1002 can balance between the first and second pivot mounts 604 such that the shaft is configured to rotate and/or pivot between positions. Thus, when a force is exerted on the pivotable backstop 402 in the first position, the flange 602 and pivot shaft 1002 can pivot to the second position when the force exceeds a threshold value.

The pivot shaft 1002 and flange 602 can be designed to resist the movement of a container 102 up to a threshold force, at which point the pivot shaft 1002 will pivot the flange 602 away from the container 102. The force at which the pivot shaft 1002 and flange 602 are configured to withstand can be limited to the torque balance between the force exerted on the container 102 and the balancing torque created by the mass of the flange 602 and pivot shaft 1002 in conjunction with gravity. By balancing the action reaction forces in this manner, the force at which the pivotable backstop 402 can pivot can be determined and adjusted as desired. In some embodiments, an additional mechanism such as a torque component (e.g., torsional spring, pneumatic cylinder, etc.) can be incorporated into the pivotable backstop 402. This can enable the adjustment of the threshold force which may cause the pivot shaft 1002 to pivot from the first position to the second position. For example, a torsional spring or pneumatic cylinder can be used in conjunction with the pivot shaft 1002 and the threshold force which may cause the pivotable backstop 402 to pivot from a first position to a second position can be adjusted based on the characteristics of the added mechanism.

Figure 7:
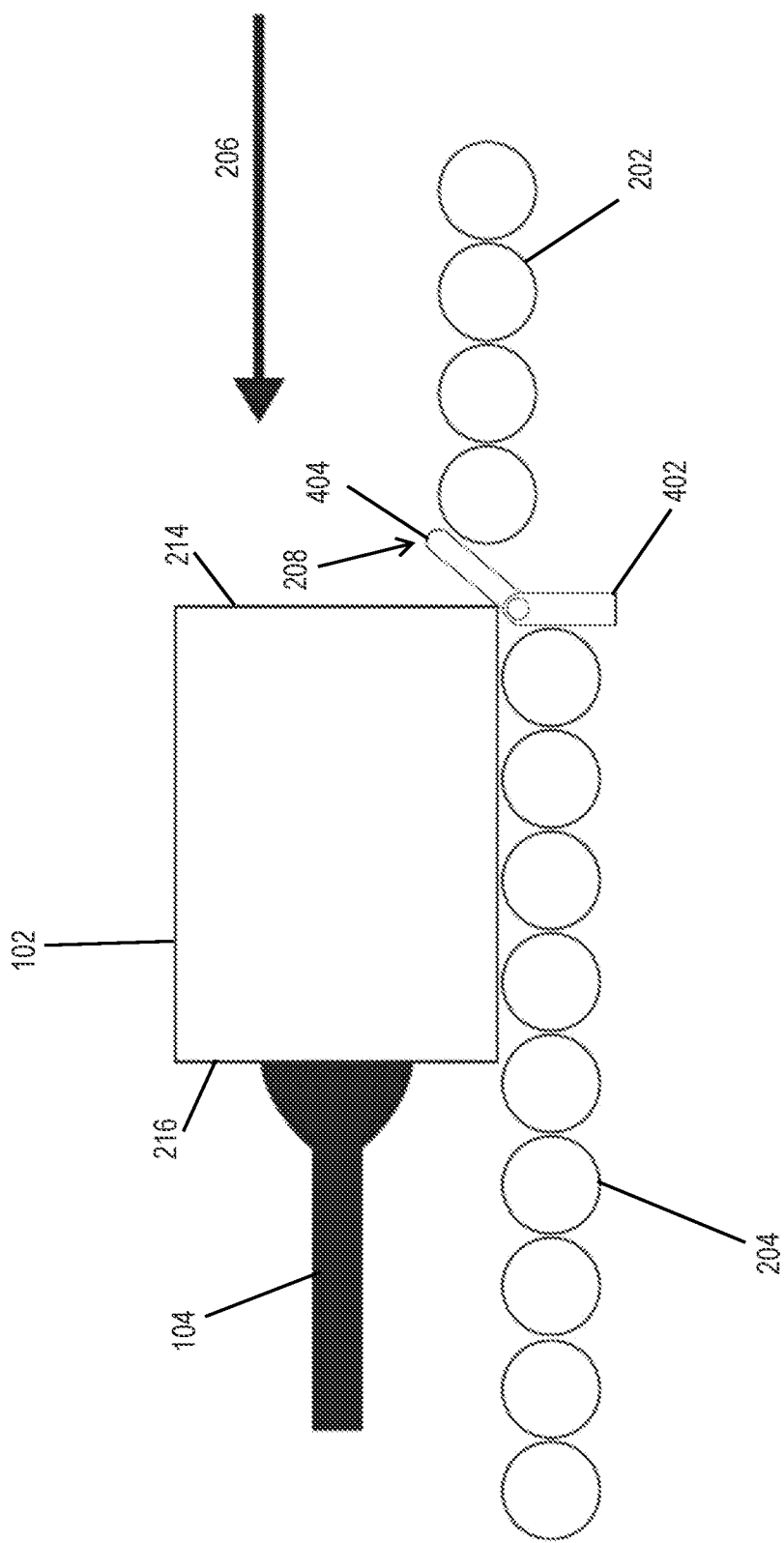
FIG. 7 illustrates the container engagement system of FIG. 5 with the pivotable backstop pivoted to a second position in accordance with various embodiments.

FIG. 7 illustrates the container engagement system of FIG. 5 with the pivotable backstop 402 pivoted to a second position in accordance with various embodiments. In additional embodiments, the pivotable backstop 402 can pivot between at least two positions, a first and second position. The first pivotable position may be arranged such that the flange surface 404 can contact the trailing side 214 of the tote 102, allowing the pivotable backstop 402 to engage with the container 102. The second position may be arranged such that the flange surface 404 is pivoted away from the second set of rollers 204 and towards the first set of rollers 202. In this arrangement, the pivotable backstop 402 can be capable of disengagement from the container 102 as the container 102 is pushed towards the backstop surface 208.

In some embodiments, the pivotable backstop 402 can pivot between the first and second positions in response to a force being exerted on the pivotable backstop 402 which exceeds a threshold value. For example, the pivotable backstop 402 in the first position can engage with a container 102 as the container 102 is pushed by a robotic end effector 104. When the robotic end effector 104 exerts a pushing force on the container 102 exceeding a threshold value, the pivotable backstop 402 can pivot to the second position, e.g., thereby disengaging from the container 102. By pivoting the pivotable backstop 402 to a second position when a threshold force is reached, the force experienced between the container 102 and the pivotable backstop 402 can be limited. A limited force can reduce the strain experienced by various components of the container engagement assembly, such as the container 102 and the pivotable backstop 402, which in turn can reduce the wear experienced by the components. Furthermore, limiting the force between the container 102 and the pivotable backstop 402 at the first position lowers the risk of any objects unintentionally being caught between the pivotable backstop 402 and the container 102 and damaging the system and/or the trapped object. For example, if an object is unintentionally caught between the container 102 and the pivotable backstop 402, the pivotable backstop 402 will pivot once the force threshold is met, lessening the likelihood of damage. Additionally, the limited force threshold can make it easier to remove obstructions from between the container 102 and the pivotable backstop 402 without being subject to a lengthy disengagement of the system. For example, if an object becomes trapped between the pivotable backstop 402 and the container 102, the pivotable backstop 402 can be triggered to pivot to the second position for ensuring easy removal of the no-longer pinched object.

Figure 8:
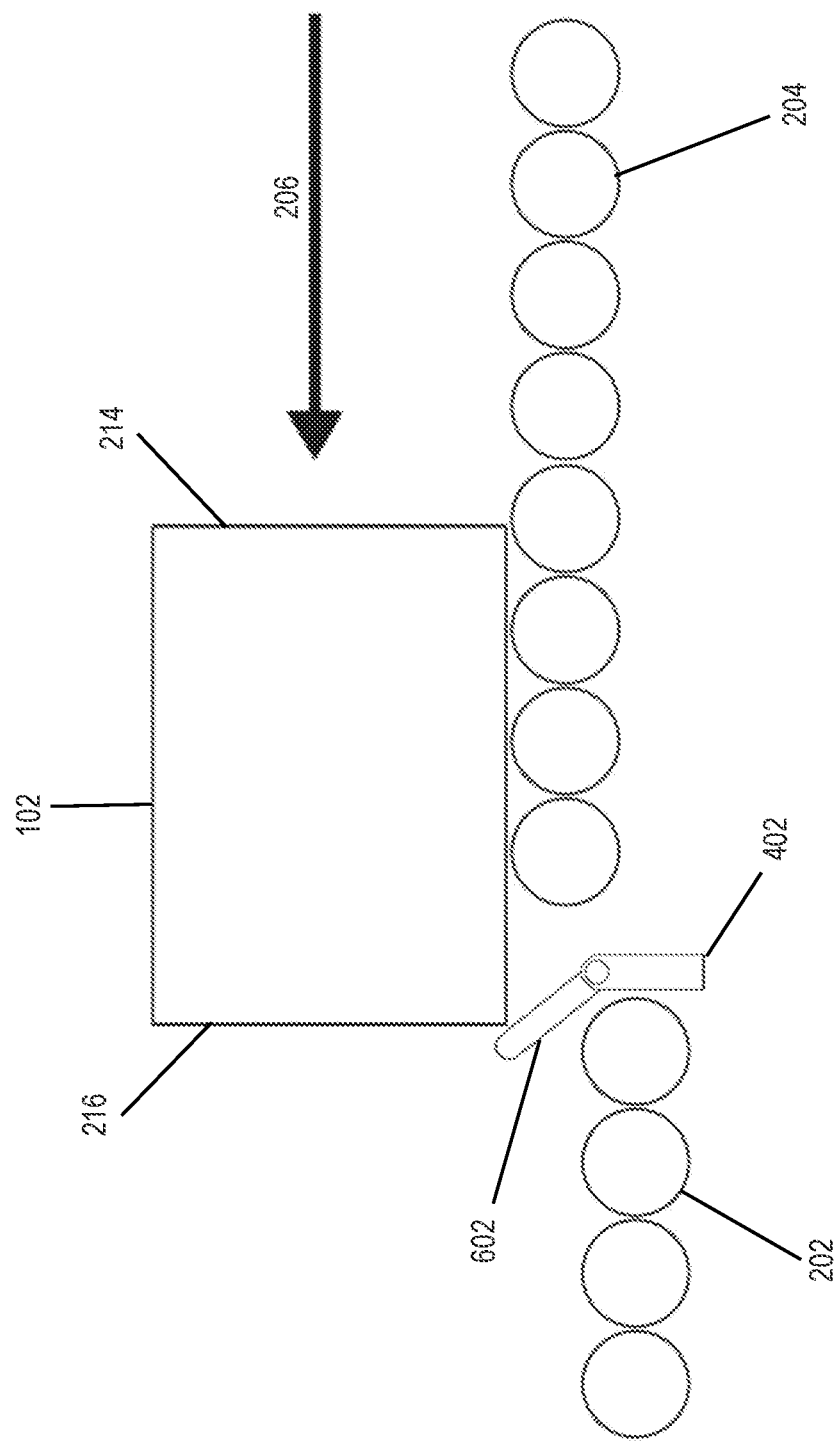
FIG. 8 illustrates the container engagement system of FIG. 5 with the pivotable backstop having been pivoted back to a first position by movement of another container in accordance with various embodiments.

FIG. 8 illustrates the container engagement system of FIG. 5 with the pivotable backstop 402 having been pivoted back to a first position by movement of another container 102 in accordance with various embodiments. The pivotable backstop 402, in the second position, can pivot back to the first position in response to an active control mechanism pivoting the pivot shaft 1002. For example, a computer system may be included in the system 100 and function as a controller that is capable of controlling various components including the pivoting of the pivotable backstop 402. Thus the computer system can be used to communicate and control the pivotable backstop 402, resetting the pivotable backstop 402 to the first position.

Alternatively or additionally, the pivotable backstop 402 can be passively reset by using a second container 102 being transferred along the conveyor 112. For example, after the pivotable backstop 402 has pivoted to the second position, a second container 102 traveling in the first direction 206 along the conveyor 112 can make contact with the flange 602. In response to the force exerted by the container 102 moving along the conveyor 112, the pivotable backstop 402 can 'reset' and pivot back to the first position. Once the pivotable backstop 402 is reset, the second container 102 can pass over the pivotable backstop 402 from the first set of rollers 202 to the second set of rollers 204 and still engage with the pivotable backstop 402 if desired, such as in response to engagement with the robotic end effector 104.

Figure 9:
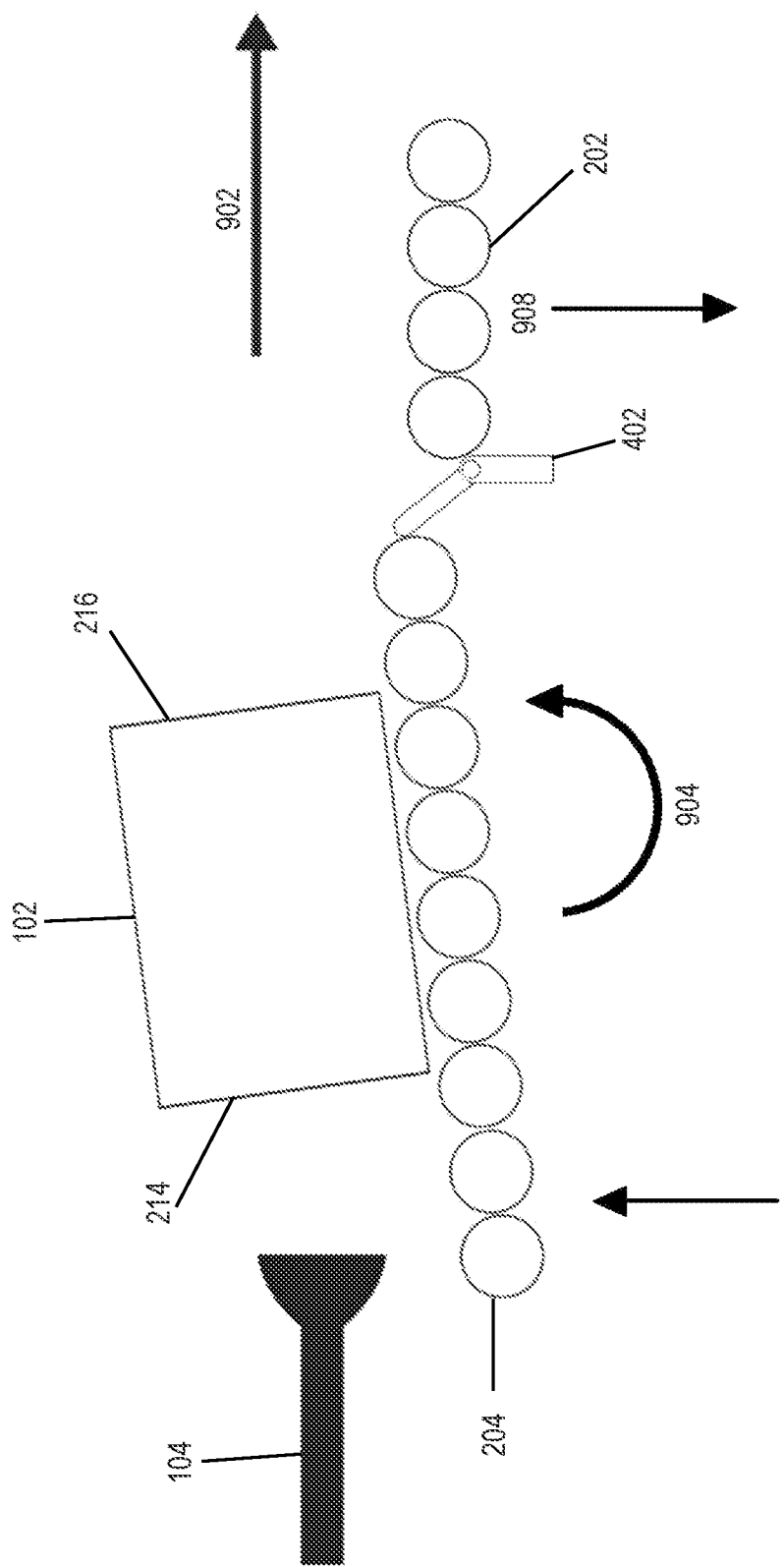
FIG. 9 illustrates the container engagement system of FIG. 5 with the pivotable backstop circumvented in accordance with various embodiments.

FIG. 9 illustrates the container engagement system of FIG. 5 with the pivotable backstop 402 and/or the stepped interface circumvented in accordance with various embodiments. In some embodiments, one or more of the sets of rollers 202, 204 can be repositioned to enable a container 102 to bypass the pivotable backstop 402 and/or the stepped interface. For example, as depicted in FIG. 9, the second set of rollers 204 can be rotated upward (such as illustrated by arrow 904) such that when a container 102 is traveling on the conveyor 112 in the second direction 902, the container 102 can avoid engaging with the flange 602 of the pivotable backstop 402. Instead, the container 102 can pass over the pivotable backstop 402 without being hindered. Any other suitable relative motion among some or all of the sets of rollers 202, 204 additionally or alternatively can be utilized to accomplish positioning for facilitating the container's 102 travel along the conveyor 112 avoiding engagement with the pivotable backstop 402. Examples can include rotating (as at 904), pivoting, raising (as at 906), lowering (as at 908), or translating a side of the first set of rollers 202 or the second set of rollers 204 to have an altered elevation difference along the stepped interface 210. For example, the second set of rollers 204 may turn (as at 904) such that an end along the stepped interface 210 is lifted above a portion of the first rollers 202 along the stepped interface 210. The rollers 202, 204 can be configured to respectively rotate (as at 904) low and/or high enough to facilitate a container 102 traveling in the second direction 902 to overcome the pivotable backstop 402 (or to overcome the stepped interface alone in arrangements in which the pivotable backstop 402 is not present).

Moving a set of rollers 202, 204 so that a container 102 traveling along the conveyor 112 can circumvent the pivotable backstop 402 can be beneficial for numerous reasons. For instance, in a case where operational needs may change from hour to hour, some conveyors 112 may run in both directions (bi-directional). The pivotable backstop 402 could prevent or hinder this reverse flow due to the pivotable backstop 402 obstructing the conveyor 112 pathway in situations in which techniques for bypassing the pivotable backstop 402 are not implemented. Thus by moving a set of rollers 202, 204 included in the conveyor 112, such as by vertically shifting (as at 906, 908) the set of rollers 202, 204 or rotating (as at 904) the set of rollers 202, 204, the set of rollers 202, 204 may allow the container 102 to overcome the pivotable backstop 402 and effectively remove the function of the pivotable backstop 402.

Alternatively or additionally, the flange 602 extending from the pivot shaft 1002 of the pivotable backstop 402 can be rotated such that it would no longer hinder the path of a container 102. For example, the pivot shaft 1002 can pivot the flange 602 down so that the flange surface 404 is pointing towards the floor. By doing this, a container 102 moving along the conveyor 112 can avoid engaging with the flange surface 404. The flange 602 may additionally or alternatively be translated out of a position for engaging a container 102, such as by lowering pivot mounts 604.

FIGS. 10A & 10B illustrates top and perspective views of an example of a pivotable backstop 402 that can be used in the system of FIG. 5 in accordance with various embodiments. As previously discussed, the pivotable backstop 402 can include a first pivot mount 604 and a second pivot mount 604 positioned between the first and second sets of rollers 202, 204 along the stepped interface 210. The first pivot mount 604 can be positioned parallel to the second pivot mount 604 such that a pivot shaft 1002 can be coupled to the first and second pivot mounts 604. The pivot shaft 1002 can be configured to rotate and/or pivot between positions while coupled to the first and second pivot mounts 604. The pivot shaft 1002 can further include a flange 602 extending from the pivot shaft 1002 to a flange surface 404.

In some embodiments, the flange surface 404 may be configured to be straight such that when engaged with a container 102, the flange surface 404 is contacting the trailing side 214 of the container 102 along all or nearly all of the flange surface 404. Alternatively, the flange surface 404 can be designed to have at least two contact points, as depicted in FIG. 10. In this configuration, the flange surface 404 is designed to contact a container 102 with both sides of the flange 602, however the center of the flange 602 is arranged so that there may be no contact with a container 102. By reducing the points of contact along the flange surface 404, a wider range and style of containers 102 can be engaged. For example, a container 102 may have a trailing side 214 with protrusions and extrusions which could make it difficult for a long flange surface 404 to securely engage with the trailing side 214. By minimizing the contact points to the two sides of the flange 602, it may be easier for the flange surface 404 to couple with the container 102 and/or to avoid capturing objects between the container 102 and the flange 602 (e.g., based on a space or recess being present between the two sides of the flange 602 and suitably sized for receipt of an object to be positioned therein without being pressed between the container 102 and the flange 602).

FIG. 11 is a flow chart that illustrates an example of a process 1100 of handling containers 102 in accordance with various embodiments. Some or all of the process 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 1100 can include operation 1102, where the tote 102 may be moved on a first set of rollers 202 in a first direction 206 towards a second set of rollers 204, which are positioned lower than the first set of rollers 202 so as to define a stepped interface 210. The process 1100 can further include operation 1104, where the tote 102 can move from the first set of rollers 202 to the second set of rollers 204. As the tote 102 moves between the rollers, the tote 102 may also move over a pivotable backstop 402 that is situated in a first position and is located along the stepped interface 210. For instance, the tote 102 can move over the pivotable backstop 402, from the first set of rollers 202 202 to a lower location at the second set of rollers 204. The process 1100 can also include operation 1106, where the leading side 216 of the tote 102 can be pushed by a robotic end effector 104 in a second direction 902 opposite to the first direction 206 so as to move a trailing side 214 of the tote 102 towards the stepped interface 210 and the first set of rollers 202. The process 1100 can further include operation 1108, where the trailing side 214 of the tote 102 can be engaged with a flange surface 404 of the pivotable backstop 402 so as to resist movement of the tote 102 in the second direction 902. For instance, the robotic end effector 104, via the leading side 216 of the tote 102, can push the tote 102 into flange surface 404 of the pivotable backstop 402, engaging the flange surface 404 with the trailing side 214 of the tote 102. The process 1100 can also include operation 1110, where, as a result of the robotic end effector 104 pushing the tote 102 in the second direction 902, the leading side 216 of the tote 102 can be engaged with the robotic end effector 104 as the flange surface 404 of the pivotable backstop 402 prevents the tote 102 from being pushed past the pivotable backstop 402 in the second direction 902 and can enable the robotic end effector 104 to engage with the leading side 216. For instance, as the robotic end effector 104 pushes the tote 102 on the leading side 216, the pivotable backstop 402 can resist the movement of the tote 102 via the flange surface 404 engagement with the tote 102 on the trailing side 214 of the tote 102. Then the robotic end effector 104 may engage with the leading side 216 of the tote 102. The process 1100 can further include operation 1112, where the pivotable backstop 402 can pivot to a second position in response to the robotic end effector 104 exerting on the tote 102 a force exceeding a predetermined threshold. For instance, as the robotic end effector 104 exerts a force on the leading side 216 of the tote 102, if the exerted force exceeds a particular force value that exceeds the predetermined threshold, the pivotable backstop 402 can pivot away from the tote 102, e.g., disengaging from the trailing side 214.

In an illustrative example, a transfer apparatus 116 may place a container 102 at a receiving location 110 of a workstation 118. The container 102 may move in the first direction 206 and transition (such as via a conveyor 112) to the collection station 108 (e.g., completing operations 1102 and 1104). A robotic end effector 104 included in the transfer apparatus 116 may move in the second direction 902 towards the container 102 to press against the container 102 and engage with the leading side 216 (e.g., completing operation 1106). As the robotic end effector 104 presses against the leading side 216 of the container 102, the trailing side 214 of the container 102 may engage with the flange surface 404 of the pivotable backstop 402 in the first position which can impede the container's 102 further movement in the second direction 902 (e.g., completing operation 1108). As the pivotable backstop 402 resists the movement of the container 102 in the second direction 902, the robotic end effector 104 can exert a force on the leading side 216 of the container 102 to engage with and remove the container 102 from the collection station 108 (e.g., completing operation 1110). If the robotic end effector 104 exerts a force on the leading side 216 of the container 102 which exceeds a predetermined threshold, the pivotable backstop 402 can pivot to a second position, thereby disengaging from the trailing side 214 of the container 102 (e.g., completing operation 1112).

FIG. 12 is a flow chart that illustrates an example of a process 1200 of resetting a pivotable backstop 402 in accordance with various embodiments. The process 1200 can include operation 1202, where, via the first set of rollers 202, a second tote 102 can be moved in a first direction 206 towards the second set of rollers 204 and the pivotable backstop 402 in the second position. The process 1200 can further include operation 1204, where the leading side 216 of the second tote 102 can engage with the flange surface 404 of the pivotable backstop 402. For instance, as the second tote 102 is traveling in the first direction 206 along the first set of rollers 202, when the tote 102 reaches the pivotable backstop 402, the tote 102 can contact and engage with the flange surface 404. The process 1200 can include operation 1206, where the pivotable backstop 402 can pivot to the first position in response to the second tote 102 pushing the flange surface 404 as the second tote 102 moves in the first direction 206. For instance, once the second tote 102 engages with the pivotable backstop 402, the first set of rollers 202 may continue to move the second tote 102 in the first direction 206. In response to the force of the movement of the second tote 102 in the first direction 206, the pivotable backstop 402 may pivot to the first position, thereby disengaging the flange surface 404 from the container 102 and facilitating movement of the container 102 over the pivotable backstop 402 from the first set of rollers 202 to the second set of rollers 204.

In an illustrative example, when the pivotable backstop 402 has been triggered and has pivoted to the second position, a second tote 102 can be transported on the conveyor 112 (e.g., completing operation 1202), run into the pivotable backstop 402 (e.g., completing operation 1204), and thereby used to push the pivotable backstop 402 back to the first position to reset the pivotable backstop 402 (e.g., completing operation 1206) and facilitate its further engagement with additional totes 102.

Figure 13:
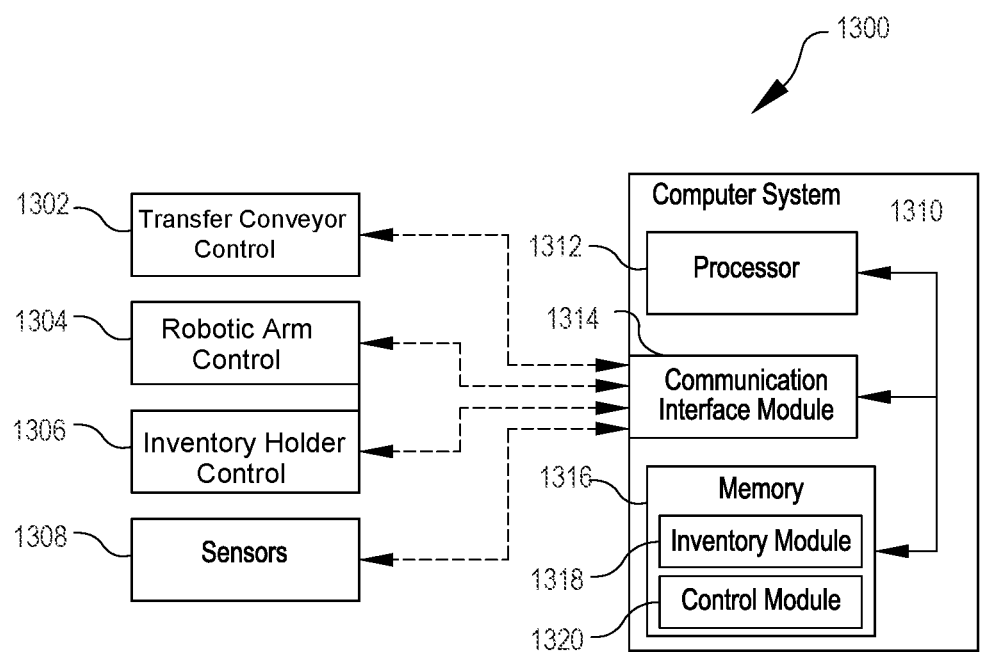
FIG. 13 is a block diagram illustrating components of a container engagement system in accordance with various embodiments.

FIG. 13 is a block diagram illustrating components of a container engagement system in accordance with various embodiments. The inventory management system 1300 may be an example of the inventory management system 100, described elsewhere herein. As shown in FIG. 13, the inventory management system 1300 includes a computer system 1310, a transfer conveyor control 1302, a robotic arm control 1304, an inventory holder control 1306, and sensors 1308. In general, the computer system 1310 may function as a controller that controls other components of the inventory management system 1300, for example, as described further below.

The transfer conveyor control 1302 may correspond to motors or other elements capable of adjusting how the conveyor 112 is loaded and run. This may include elements that affect how containers 102 are loaded (e.g., the robotic end effector 104 or other elements of the inventory management system 1300) and/or elements that may affect a speed or other characteristics of how the containers 102 are moved (e.g., the conveyor 112 or other elements of the container engagement system). The robotic arm control 1304 may correspond to the transfer apparatus 116, the robotic end effectors 104, and/or other elements capable of moving, transferring, and/or adjusting the containers 102 or other elements of the container inventory management system 1300. The inventory holder control 1306 may correspond to robotic arms, motors, actuators, or other elements capable of adjusting, positioning and/or other functionality of the containers 102 and/or inventory holder 106, for example. The sensor 1308 may include optical sensors, pressure sensors, or any other sensors that may obtain information about items, containers 102, and/or other elements of the inventory management system 1300, which may include information about speed (e.g., of conveyors 112, items, containers 102, robotic arms, actuators, etc.), actuator operations, alignment, or any other conditions or state information about components of the inventory management system 1300. The transfer conveyor control 1302, the robotic arm control 1304, the inventory holder control 1306, and the sensors 1308 may function as appropriate inputs and/or outputs for control of the inventory management system 1300 by the computer system 1310.

The illustrated computer system 1310 includes a communication interface module 1314, a processor 1312, a memory 1316, an inventory module 1318, and a control module 1320. The computer system 1310 may represent a single component, multiple components located at a central location within the inventory management system 1300, or multiple components distributed throughout the inventory management system 1300. In general, the computer system 1310 may include an appropriate combination of hardware and/or software suitable to provide the described functionality.

Processor 1312 is operable to execute instructions associated with the functionality provides by the computer system 1310. Processor 1312 may comprise one or more general purpose computers, dedicated microprocessors, or other processing devices capable of communicating electronic information. Examples of processor 1312 include one or more application-specific integrated circuits (ASICs), field programmable gate arrays (FPGAs), digital signal processors (DSPs) and any other suitable specific or general-purpose processors.

Memory 1316 stores processor instructions, inventory requests, state information for the various components of inventory management system 1300 and/or any other appropriate values, parameters, or information utilized by computer system 1310 during operation. Memory 1316 may represent any collection and arrangement of volatile or nonvolatile, local or remote devices suitable for storing data. Examples of memory 1316 include, but are not limited to, random access memory (RAM) devices, read only memory (ROM) devices, magnetic storage devices, optical storage devices or any other suitable data storage devices.

Communication interface module 1314 facilitates communication between computer system 1310 and other components of inventory management system 1300, including information and/or instructions conveyed between any of the transfer conveyor control 1302, the robotic arm control 1304, the inventory holder control 1306, sensors 1308, inventory module 1318, and control module 1320. These communications may represent communication of any form appropriate based on the capabilities of computer system 1310 and may include any suitable information. Depending on the configuration of computer system 1310, communication interface module 1314 may be responsible for facilitating either or both of wired and wireless communication between computer system 1310 and the various components of inventory management system 1300. In particular embodiments, computer system 1310 may communicate using communication protocols such as 802.11, Bluetooth, or Infrared Data Association (IrDA) standards.

In general, the inventory module 1318, the control module 1320, and the communication interface module 1314 may each represent any appropriate hardware and/or software suitable to provide the described functionality. In addition, as noted above, computer system 1310 may, in particular embodiments, represent multiple different discrete components and any or all of the inventory module 1318, the control module 1320, and the communication interface module 1314 may represent components physically separate from the remaining elements of computer system 1310. Moreover, any two or more of the inventory module 1318, the control module 1320, and the communication interface module 1314 may share common components. For example, in particular embodiments, the inventory module 1318 and the control module 1320 represent computer processes executing on processor 1312 and communication interface module 1314 comprises a wireless transmitter, a wireless receiver, and a related computer process executing on processor 1312.

The inventory module 1318 may determine conditions present in the inventory management system 1300, track inventory requests, and/or determine objectives for the inventory management system 1300. For example, the inventory module 1318 may determine (e.g., based on a sensor 1308) which items are in which containers 102 or which containers 102 are to be transfers to which conveyors 112. The inventory module 1318 may also determine targets (e.g., a target container 102 within a particular inventory holder 106, a target container 102 having a particular item, a target workstation 118 designated to receive a target container 102 from a target inventory holder 106). The inventory module 1318 may also determine the state of other elements within the inventory management system 1300, such as a speed or orientation of an item, a conveyor 112, container 102, a robotic end effector 104, a pivotable backstop 402 etc.

The control module 1320 may control components within the inventory management system 1300. For example, the control module 1320 may send commands to the transfer conveyor control 1302, the robotic arm control 1304, the inventory holder control 1306, and the sensors 1308 to control respective components of the inventory management system 1300. In various embodiments, the control module 1320 may control components based on information provided by the inventory module 1318. For example, based on designated targets and relative location of those targets identified by the inventory module 1318, the control module 1320 may activate a transfer apparatus 116 to change a state of container 102 to cause unloading or avoid unloading at a particular workstation 118. The control module 1320 may implement other changes based on the inventory module 1318 determining other actions may be warranted to move other elements to suitable locations (such as adjusting a conveyor 112 speed, adjusting a conveyor orientation, operating robotic end effectors 104, or controlling other elements of the inventory management system 1300).

As an illustrative example, the inventory module 1318 may determine, from the plurality of inventory holders 106, a target inventory holder 106 having a target container 102. The inventory module 1318 may also determine, from the plurality of workstations 118, a target workstation 118 designated to receive the target container 102. This may include determining the receiving station 110 that is designated to receive the container 102. Based on such determinations, the control module 1320 may cause pivoting of the pivotable backstop 402 at the target workstation 118 to move the pivotable backstop 402 at the target workstation 118 into a first position suitable for engaging with a target container 102 so that a robotic end effector 104 may further engage with the target container 102 at a collection station 108 of the target workstation 118.

The specification and drawings are to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of tote engagement, the method comprising:
    moving a tote on a first set of rollers in a first direction towards a second set of rollers, the second set of rollers positioned lower than the first set of rollers so as to define a stepped interface;

moving the tote, from the first set of rollers to the second set of rollers, over a pivotable backstop that is situated in a first position and is located along the stepped interface;

pushing a leading side of the tote by a robotic end effector in a second direction opposite to the first direction so as to move a trailing side of the tote toward the stepped interface and toward the first set of rollers;

engaging a trailing side of the tote with a flange edge of the pivotable backstop so as to resist movement of the tote in the second direction; and engaging, as a result of the robotic end effector pushing against the tote in the second direction, the leading side of the tote with the robotic end effector as the flange edge of the pivotable backstop prevents the tote from being pushed past the pivotable backstop in the second direction and enables the robotic end effector to engage with the leading side; and pivoting the pivotable backstop to a second position in response to the robotic end effector exerting on the tote a force exceeding a predetermined threshold.

2. The method of claim 1, further comprising:

moving, via the first set of rollers, a second tote in the first direction towards the second set of rollers and the pivotable backstop in the second position;

engaging the leading side of the second tote with the flange edge of the pivotable backstop; and pivoting the pivotable backstop to the first position in response to the second tote pushing the flange edge as the second tote moves in the first direction.

3. The method of claim 1, wherein the pivotable backstop comprising:

a first pivot mount and a second pivot mount positionable between the first set of rollers and the second set of rollers, the first pivot mount parallel to the second pivot mount;

a flange extending from a first base of the pivotable backstop to the flange edge of the pivotable backstop; and a pivot shaft coupled to the first pivot mount and the second pivot mount and supporting the first base.

4. The method of claim 1, further comprising:

raising the second set of rollers above the first set of rollers to permit tote travel in the second direction over the pivotable backstop.

5. The method of claim 1, wherein the predetermined threshold is based at least in part on mass of the pivotable backstop with gravity or with a torque component.

6. The method of claim 1, wherein the robotic end effector includes a suction cup configured to engage with the leading side of the tote when the robotic end effector exerts a first amount of force on the tote.

7. A container engagement system comprising:

a conveyor configured to carry a container at least in a first direction, the conveyor including a first set of rollers and a second set of rollers, the second set of rollers positioned lower than the first set of rollers so as to define a stepped interface;

a robotic end effector designed to engage with a leading side of the container when an underside of the container is supported by the second set of rollers, the robotic end effector being capable of exerting force on the container; and a pivotable backstop located along the stepped interface and between the first set of rollers and the second set of rollers, the pivotable backstop having a pivot shaft and a flange, the flange extending from the pivot shaft and terminating at a first edge, the pivotable backstop configured to pivot at least between a first position and a second position, the first position arranged such that the first edge contacts a trailing side of the container in response to the robotic end effector pushing the leading side of the container contrary to the first direction and towards the pivotable backstop, the pivotable backstop configured in the first position to resist movement of the container to enable the robotic end effector to engage with the leading side of the container, the pivotable backstop being pivotable from the first position to the second position in response to the robotic end effector exerting force on the container exceeding a predetermined threshold.

8. The container engagement system of claim 7, wherein the pivotable backstop is configured to pivot back from the second position to the first position in response to a second container pushing the pivotable backstop as the second container moves in the first direction over the pivotable backstop from the first set of rollers to the second set of rollers.

9. The container engagement system of claim 7, wherein relative positioning of the first set of rollers and the second set of rollers is adjustable to arrange at least a portion of the second set of rollers along the stepped interface to be above at least a portion of the first set of rollers along the stepped interface so as to permit the container to travel contrary the first direction over the pivotable backstop without the pivotable backstop engaging with the trailing side of the container.

10. The container engagement system of claim 7, wherein the predetermined threshold is based at least in part on at least one of a mass of the pivotable backstop with gravity or with a torque component.

11. The container engagement system of claim 7, wherein the pivotable backstop comprises:

a first pivot mount and a second pivot mount positionable between the first set of rollers and the second set of rollers, the first pivot mount parallel to the second pivot mount, wherein the pivot shaft is coupled to the first pivot mount and the second pivot mount.

12. The container engagement system of claim 7, wherein the robotic end effector includes a suction cup configured to engage with the leading side of the container when the robotic end effector exerts a first amount of force on the container.

13. A container engagement system comprising:

a first set of rollers;

a second set of rollers, the second set of rollers positioned lower than the first set of rollers so as to define a stepped interface, the first set of rollers and the second set of rollers configured to carry a container; and a backstop surface positioned along the stepped interface between the first set of rollers and the second set of rollers, the backstop surface arranged so as to contact a trailing side of the container, traveling on the second set of rollers, in response to a robotic end effector pushing a leading side of the container towards the backstop surface and the first set of rollers, the backstop surface configured to resist movement of the container to enable the robotic end effector to engage with the leading side of the container.

14. The container engagement system of claim 13, wherein the backstop surface is part of the first set of rollers positioned above the second set of rollers.

15. The container engagement system of claim 13, wherein the backstop surface is included in a pivotable structure located between the first set of rollers and the second set of rollers, the pivotable structure configured to engage with a container.

16. The container engagement system of claim 15, wherein the pivotable structure comprises:
   a first pivot mount and a second pivot mount positionable between the first set of rollers and the second set of rollers, the first pivot mount parallel to the second pivot mount;
   a flange extending from a first base to a first edge, the first edge designed to engage with a leading side of the container; and
   a pivot shaft coupled to the first pivot mount and the second pivot mount and supporting the first base, the pivot shaft configured to pivot between at least a first position and a second position.

17. The container engagement system of claim 16, wherein the pivot shaft is pivotable to the second position in response to exertion on the flange of a force exceeding a predetermined threshold.

18. The container engagement system of claim 17, wherein the pivot shaft is configured to pivot to the first position in response to a second container pushing the flange as the second container moves over the pivot shaft from the first set of rollers to the second set of rollers.

19. The container engagement system of claim 17, wherein the predetermined threshold is based at least in part on at least one of a mass of the pivotable structure with gravity or with a torque component.

20. The container engagement system of claim 13, wherein relative positioning of the first set of rollers and the second set of rollers is adjustable to arrange at least a portion of the second set of rollers along the stepped interface to be above at least a portion of the first set of rollers along the stepped interface so as to permit the container to travel contrary a first direction over the backstop surface without the backstop surface engaging with the trailing side of the container.

* * * * *